UNITED STATES PATENT OFFICE.

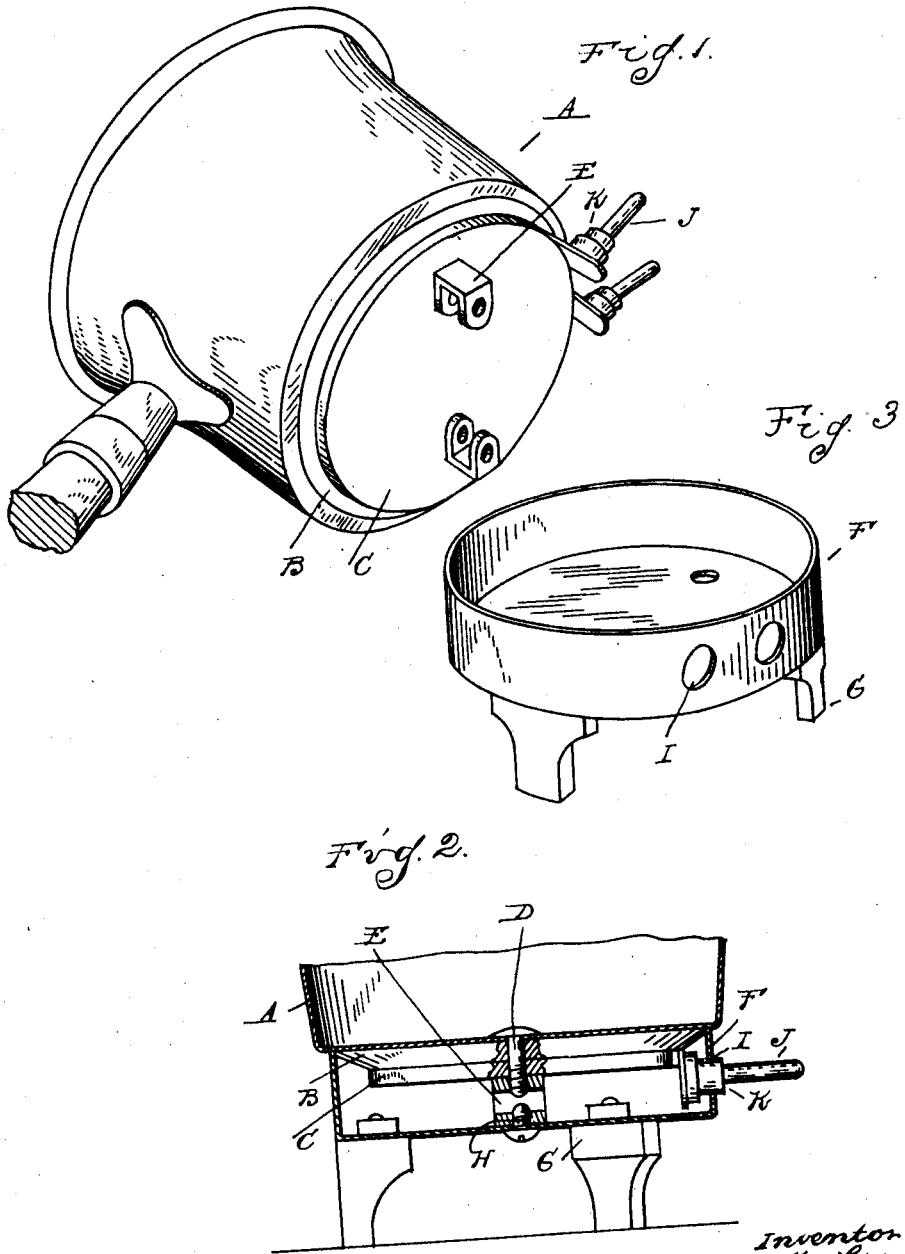

FRANK KUHN, OF DETROIT, MICHIGAN.

ELECTRIC HEATER.

1,087,595.  Specification of Letters Patent.  Patented Feb. 17, 1914.

Application filed October 5, 1912. Serial No. 724,173.

*To all whom it may concern:*

Be it known that I, FRANK KUHN, a citizen of the United States of America, residing at Detroit, in the county of Wayne and State of Michigan, have invented certain new and useful Improvements in Electric Heaters, of which the following is a specification, reference being had therein to the accompanying drawings.

The invention relates to electric heaters, particularly designed for use on cooking utensils, and the invention consists in the construction as hereinafter set forth.

In the drawings: Figure 1 is a perspective view of the utensil with the heating-element attached to the base thereof. Fig. 2 is a vertical, central section through the utensil and stand. Fig. 3 is a perspective view of the stand.

A is a cooking utensil of any suitable form, provided with a flat bottom; and B is a heating-element, preferably armored and of disk form, being adapted to contact with the bottom of the utensil A.

C is a heat-distributing plate beneath the element B.

D are studs depending from the bottom of the utensil and passing through registering apertures in the element B and distributing plate C.

E are brackets having threaded sockets for respectively engaging the studs D.

F is a stand formed of a sheet metal cup, of a diameter to fit about the element B, with its upper edge contacting with the bottom of the utensil A. This stand is provided with a plurality of legs G, and is secured to the utensil by screws H engaging the brackets E.

I are apertures in the side of the stand through which terminal contacts J on the element project.

K are insulator bushings on the terminals J engaging the apertures I.

The parts constructed as described may be cheaply manufactured and easily assembled.

What I claim as my invention is:

1. The combination with a cooking utensil having a flat bottom, of a disk-shaped heating unit in contact with said bottom, a stand comprising a sheet metal cup and supporting legs, said cup surrounding said heating unit and having its upper edge in contact with the bottom of said utensil, a terminal contact projecting outward from said unit through an aperture in said cup, an insulating bushing upon said contact closing the aperture in said cup, and a securing connection between said unit and stand.

2. The combination with a cooking utensil, having a flat bottom of a disk-shaped heating-unit in contact with said bottom, a heat-distributing plate beneath said heating-unit, a stud projecting downward from the bottom of said utensil through registering apertures in said unit and distributing plate, a cup-shaped, metallic stand surrounding said unit and forming an air space therebeneath, the upper edge of said stand being in contact with the bottom of said utensil, and a member engaging said stud to clamp said heat-distributing plate and unit to the bottom, and also constituting a securing connection between the same and said stand.

3. The combination with a cooking utensil, having a flat bottom, of a disk-shaped heating-unit in contact with said bottom, a heat-distributing plate beneath said heating-element, a threaded stud depending from said bottom and passing through registering apertures in said unit and distributing-plate, a stand comprising a sheet metal cup and supporting legs, said cup surrounding said unit and distributing plate, and forming an air space therebeneath, its upper edges being in contact with the bottom of said utensil, terminal contacts projecting radially outward from said unit through apertures in said cup, insulating bushings upon said contacts closing the apertures in said cup, and a member having a threaded engagement with said stud for clamping said heat-distributing plate and unit to the bottom of said utensil and also constituting a tie for connecting said cup thereto.

4. The combination with a cooking utensil, having a flat, circular bottom of a disk-shaped heating-unit of a slightly lesser diameter than said bottom, a heat-distributing plate beneath said unit, a stud depending from said bottom and passing through registering apertures in said unit and heat-distributing plate, a stand comprising a cylindrical, metal cup surrounding said unit and distributing plate, with its upper edge in contact with said bottom and being of slightly lesser diameter than the latter, supporting legs secured to said cup, radially-extending terminal contacts on said unit, passing through registering apertures in the side of said cup, insulator bushings sleeved upon said terminal contacts and closing said apertures, and a member engaging said stud to clamp said heat-distributing plate and heating-unit to said bottom and also constituting a tie for securing said stand.

In testimony whereof I affix my signature in presence of two witnesses.

FRANK KUHN.

Witnesses:
JAMES P. BARRY,
PHYLLIS COBURN.